(12) United States Patent
Mineo

(10) Patent No.: US 6,852,396 B1
(45) Date of Patent: *Feb. 8, 2005

(54) PHOTODIFFUSION SHEET AND BACKLIGHT UNIT USING THIS

(75) Inventor: Yutaka Mineo, Wakayama (JP)

(73) Assignee: Keiwa, Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/786,565

(22) PCT Filed: Sep. 10, 1999

(86) PCT No.: PCT/JP99/04976

§ 371 (c)(1),
(2), (4) Date: Mar. 7, 2001

(87) PCT Pub. No.: WO00/17676

PCT Pub. Date: Mar. 30, 2000

(30) Foreign Application Priority Data

Sep. 17, 1998  (JP) ............................................ 10-262631

(51) Int. Cl.[7] ......................... B32B 7/02; G02F 1/1335; G02B 13/02; G02B 17/00; F21V 11/00
(52) U.S. Cl. ....................... 428/212; 428/220; 349/112; 359/599; 359/601; 359/608; 359/609; 359/707; 362/355
(58) Field of Search ................................ 362/558, 330, 362/333, 355; 359/599; 428/195, 212

(56) References Cited

U.S. PATENT DOCUMENTS

| 5,800,909 A | * | 9/1998 | Nitta et al. .................. 428/207 |
| 5,900,309 A | * | 5/1999 | Kitamura et al. ............ 428/212 |
| 6,002,464 A | * | 12/1999 | Fujisawa et al. ............ 349/112 |
| 6,111,699 A | * | 8/2000 | Iwata et al. .................. 359/599 |
| 6,579,606 B1 | * | 6/2003 | Uchiya et al. ............... 428/323 |
| 6,709,143 B2 | * | 3/2004 | Harada et al. ............... 362/558 |

FOREIGN PATENT DOCUMENTS

| JP | 57-2735 | 1/1982 |
| JP | 2-60696 | 3/1990 |
| JP | 3-3712 | 1/1991 |
| JP | 7-5305 | 1/1995 |
| JP | 7-218705 | 8/1995 |
| JP | 07-333409 | 12/1995 |
| JP | 08-227005 | 9/1996 |
| JP | 09-127313 | 5/1997 |
| WO | WO 82/02403 | 7/1982 |

OTHER PUBLICATIONS

Birk, *Chemistry*, Houghman Mifflin Company, p. 483, 1994.*

* cited by examiner

*Primary Examiner*—Rena Dye
*Assistant Examiner*—Lawrence Ferguson
(74) *Attorney, Agent, or Firm*—Marshall, Gerstein & Borun LLP

(57) ABSTRACT

It is an object of the present invention to provide a light diffusing sheet that has a less tendency to be deflected due to heat generated by a lamp and a back light unit using this. The light diffusing sheet of the present invention comprises a base sheet and a light diffusing layer provided on a surface of the base sheet. The light diffusing layer is formed by dispersing resinous beads and a fine inorganic filler into a binder. It is preferable that the fine inorganic filler has an averaged particle diameter of not smaller than 5 nanometers and smaller than 1 micrometer. It is preferable that the amount of the fine inorganic filler to be mixed is 10 parts to 500 parts by weight for 100 parts by weight of a polymer component in the binder. As the fine inorganic filler, colloidal silica is used.

7 Claims, 3 Drawing Sheets

PHOTODIFFUSION SHEET AND BACKLIGHT UNIT USING THIS

TECHNICAL FIELD

The present invention relates to a light diffusing sheet used in a backlight unit incorporated into a liquid crystal display and a backlight unit using the light diffusing sheet.

BACKGROUND ART

Conventionally, as a backlight unit incorporated into a liquid crystal display, there has been used a backlight unit comprising a lamp as a source for generating light rays, a light guiding plate disposed laterally of the lamp for guiding the light rays emitted from the lamp toward a front surface side, and a light diffusing sheet formed on a front surface side of the light guiding plate (on a screen side of the liquid crystal display).

As the light diffusing sheet, there has been proposed a light diffusing sheet comprising a light diffusing layer formed by applying a resinous composition including dispersed resinous beads on a surface of a base sheet made of synthetic resin such as polyethylene terephthalate (see Japanese Utility Model Publication No. Hei 5-73602) In this light diffusing sheet, the light rays transmitted through the light diffusing layer can be uniformly diffused by the resinous beads, resulting in enhanced luminance of the screen of the liquid crystal display.

To suppress partial adhesion (sticking) between a rear surface of the light diffusing sheet and a front surface of the light guiding plate and to thereby prevent a luminance nonuniformity of the screen, there has been proposed a light diffusing sheet comprising a sticking-proof layer formed by applying a resinous composition including dispersed resinous beads on a rear surface of a base sheet (for example, see Japanese Utility Model Publication No. Hei 7-8803).

By the way, these light diffusing sheets have a drawback in that these sheets are subject to deformation due to heat because the base sheets are made of the synthetic resin. On the other hand, the lamp as the source for generating light rays is adapted to emit light and generate heat simultaneously. In general, a portion of the light diffusing sheet in the vicinity of the lamp is exposed to temperatures of approximately 80 to 90° C. For this reason, the light diffusing sheet is thermally deformed and partially deflected. The deflection causes the luminance nonuniformity of the screen.

DISCLOSURE OF THE INVENTION

The present invention has been developed for the purpose of obviating the above-described problem, and an object of the present invention is to provide a light diffusing sheet that has a less tendency to be deflected due to heat generated by a lamp and a backlight unit using this.

To solve the above-described problem, there is provided a light diffusing sheet comprising: a transparent base sheet; and a light diffusing layer provided on a surface of the base sheet, wherein the light diffusing layer is formed by dispersing resinous beads and a fine inorganic filler into a binder, and the fine inorganic filler is colloidal silica.

According to this invention, since the resinous beads and the fine inorganic filler as light diffusing materials are contained in the binder of the light diffusing layer, an apparent crystallinity index of the light diffusing sheet is increased and heat resistance is improved. Consequently, the deflection of the light diffusing sheet can be suppressed.

In the light diffusing sheet, the resinous beads of the light diffusing layer have an averaged particle diameter of 1 micrometer to 50 micrometers and the fine inorganic filler of the light diffusing layer has an averaged particle diameter of not smaller than 5 nanometers and smaller than 1 micrometer.

Thereby, the deflection of the light diffusing sheet can be suppressed while maintaining a preferable light diffusing ability. In addition, the amount of the fine inorganic filler mixed into the light diffusing layer is 10 parts to 500 parts by weight for 100 parts by weight of a polymer component in the binder. Thereby, the heat resistance of the light diffusing sheet and the easiness of fabrication operation of the light diffusing sheet can be achieved. When using the colloidal silica as the fine inorganic filler, the application operation of the resinous composition forming the light diffusing layer can be simplified as mentioned later.

To solve the above-described problem, there is further provided a light diffusing sheet comprising: a transparent base sheet; a light diffusing layer provided on a front surface side of the base sheet; and a sticking-proof layer provided on a rear surface side of the base sheet, wherein the sticking-proof layer is formed by dispersing resinous beads and a fine inorganic filler into a binder, and the fine inorganic filler is colloidal silica.

According to this invention, since the resinous beads and the fine inorganic filler as light diffusing materials are contained in the binder of the sticking-proof layer, the apparent crystallinity index of the light diffusing sheet is increased and heat resistance is improved. Consequently, the deflection of the light diffusing sheet can be suppressed., In the light diffusing sheet, the resinous beads of the sticking-proof layer have an averaged particle diameter of 1 micrometer to 50 micrometers and the fine inorganic filler of the light diffusing layer has an averaged particle diameter of not smaller than 5 nanometers and smaller than 1 micrometer.

Thereby, the deflection of the light diffusing sheet can be suppressed while maintaining a preferable sticking-proof ability. In addition, the amount of the fine inorganic filler mixed into the sticking-proof layer is 10 parts to 500 parts by weight for 100 parts by weight of a polymer component in the binder. Thereby, the heat resistance of the light diffusing sheet and the easiness of fabrication operation of the light diffusing sheet can be achieved. When using the colloidal silica as the fine inorganic filler, the application operation of the resinous composition forming the sticking-proof layer can be simplified as mentioned later.

These light diffusing sheets are less deflected due to heat, and if the backlight unit is formed by using this, the luminance nonuniformity of the liquid crystal display can be suppressed.

BEST MODE FOR CARRYING OUT THE INVENTION

Hereinafter, the present invention will be described with reference to Figures.

Figure 1:
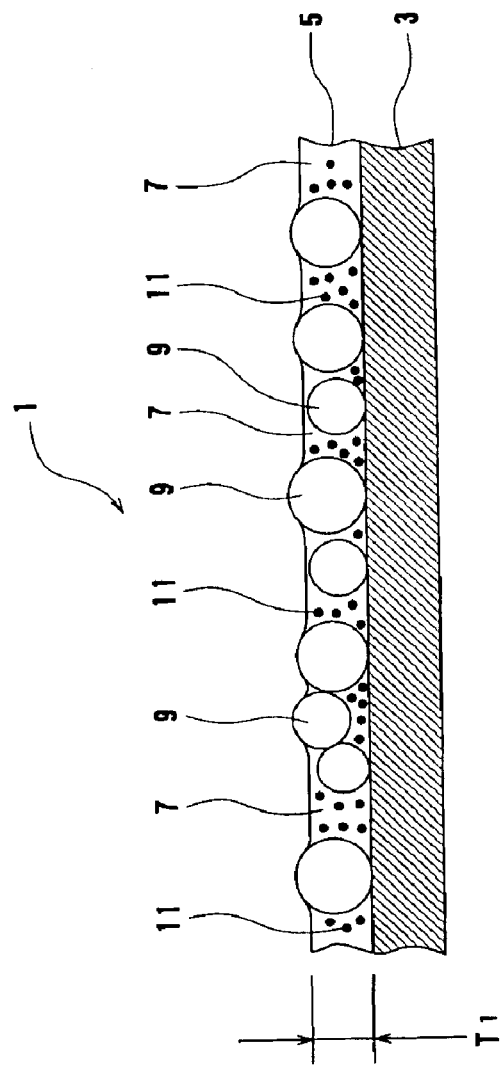
FIG. 1 is a cross-sectional view in which a light diffusing sheet of an embodiment of the present invention is partially omitted.

FIG. 1 is a cross-sectional view in which a light diffusing sheet 1 of an embodiment of the present invention is partially omitted. In FIG. 1, an upper side corresponds to a front surface side (screen side of a liquid crystal display) and a lower-side corresponds to a rear surface side. The light diffusing sheet 1 comprises a base sheet 3 and a light diffusing sheet 5 provided on a surface of the base sheet 3.

The base sheet 3 is made of synthetic resin such as polyethylene terephthalate, polyethylene naphthalate, acrylic resin, polycarbonate, polystyrene, polyolefin, cellulose acetate, weather-resistant vinyl chloride. The base sheet 3 is transparent because needs to transmit light rays and is preferably transparent and colorless. The thickness of the base sheet 3 is not limited and set to 50 to 250 micrometers, for example. If the thickness of the base sheet 3 is less than the above range, curling tends to occur in application of a resinous composition forming the light diffusing layer 5. On the other hand, if the thickness of the base sheet 3 is more than the above range, the luminance of the liquid crystal display is reduced, and the thickness of the backlight unit 13 is increased, which is contrary to requirements for a thinner liquid crystal display.

The light diffusing layer 5 is constituted by a binder 7, resinous beads 9 dispersed into the binder 7, and a fine inorganic filler 11 dispersed into the binder 7. The dispersion of the fine inorganic filler 11 into the light diffusing layer 5 increases an apparent crystallinity index of the light diffusing sheet 1. Consequently, heat-resistance of the light diffusing sheet 1 is improved and deflection of the sheet it is suppressed. In addition, the dispersion of the resinous beads 9 into the light diffusing layer 5 allows light rays transmitted from a rear surface sides to a front surface side to be uniformly diffused. Some of the resinous beads 9 have upper end portions protruded from the binder 7. Th provision of the resinous beads 9 embedded in the binder 7 and the beads 9 having upper end portions protruded therefrom can greatly diffuse the light rays. The thickness of the light diffusing layer 5 (thickness of the binder 7 except the resinous beads 9 that is represented by Ti in FIG. 1) is not limited and is set to approximately 10 to 30 micrometers, for example.

The reason why the dispersion of the fine inorganic filler 11 increases the apparent crystallinity index of the light diffusing sheet 1 is unclear but might be that the fine inorganic filler 11 exhibits behavior similar to that of a crystalline portion of a crystalline polymer and prevents thermal movement of a molecular chain of a polymer used for the binder.

As examples of the polymer used for the binder 7, there are acrylic-based resin, polyurethane, polyester, fluorine-based resin, silicone based resin, polyamide, epoxy resin, and the like. In addition to the above polymers, elasticizer, stabilizer degradation inhibitor, dispersant, anti-static additive, and the like may be mixed into the binder 7. The binder 7 is transparent because it needs to transmit light rays and is preferably colorless and transparent.

The resinous beads 9 are substantially sphere-shaped. The materials of the resinous beads 9 are acrylic resin, polyurethane, polyvinyl chloride, polystyrene, polyacrylonitrile, polyamide, and the like. The resinous beads 9 are preferably transparent for a larger amount of the light rays transmitted through the light diffusing sheet 1 and are more preferably colorless and transparent.

The averaged particle diameter of the resinous beads 9 is preferably 1 to 50 micrometers and is more preferably 2 to 20 micrometers. If the averaged particle diameter is less than the above range, an unsatisfactory light diffusing effect is provided, whereas if the averaged particle diameter is larger than the above range, the application of the resinous composition forming the light diffusing layer 5 becomes difficult. The averaged particle diameter of the resinous beads 9 is derived by enlarging arbitrarily extracted 100 resinous beads 9 by using a microscope to measure particle diameters and by simply averaging the measured particle diameters. When the resinous beads 9 are not sphere-shaped, dimensions of the resinous beads 9 in an arbitrary direction and dimensions of the resinous beads 9 in a direction orthogonal to the arbitrary direction are averaged and the resulting averaged value is deemed as the particle diameter of the resinous beads 9.

The amount of the resinous beads 9 mixed into the light diffusing layer 5 is preferably 10 to 500 parts by weight for 100 parts by weight of a polymer component in the binder 7 and is more preferably 10 to 300 parts by weight. If the amount of the mixed resinous beads 9 is less than the above range, the light diffusion effect is unsatisfactorily provided, whereas the amount of the mixed beads 9 is more than the above range, the application of the resinous composition for forming the light diffusing layer 5 becomes difficult.

The fine inorganic filler 11 is, for example, colloidal silica, smectite, colloidal magnesium carbonate, mica, and the like. Among these fine inorganic fillers 11, the colloidal silica is preferable, because if stirring of the resinous composition forming the light diffusing layer 5 is interrupted, the viscosity of the resinous composition is not greatly increased, and therefore adjusting operation or application operation of the resinous composition is easy.

To prevent loss of the light rays transmitted through the light diffusing sheet 1, it is preferable that the averaged particle diameter of the fine inorganic filler 11 is made as small as possible. Specifically, the averaged particle diameter is preferably smaller than 1 micrometer and is 400 nanometers or smaller corresponding to not larger than a visible wavelength of light. Further, the averaged particle diameter is most preferably 50 nanometers or smaller, to prevent the light diffusing sheet 1 from turning opaque white under the influence of a short wavelength. Since the averaged particle diameter of the fine inorganic filler 11 is preferably as small as possible, a lower limit thereof is not restricted and the general averaged particle diameter of the fine inorganic filler 11 is 5 nanometer or larger. The averaged particle diameter of the fine inorganic filler 11 is derived by enlarging arbitrarily extracted 100 particles of the fine inorganic filler 11 by using a microscope to measure particle diameters and by simply averaging the measured particle diameters. When the fine inorganic filler 11 is not sphere-shaped, dimensions of particles of the fine inorganic filler 11 in an arbitrary direction and dimensions of particles of the fine inorganic filler 11 in a direction orthogonal to the arbitrary direction are averaged and the resulting averaged value is deemed as the particle diameter of the fine inorganic filler 11.

The amount of the fine inorganic filler 11 mixed into the light diffusing layer 5 is preferably 10 to 500 parts by weight for 100 parts by weight of the polymer component in the binder 7 and is more preferably 10 to 200 parts by weight. If the amount of the mixed fine inorganic filler 11 is less than the above range, thermal deformation of the light diffusing sheet 1 can not be satisfactorily avoided, whereas if the amount is more than the above range, the application of the resinous composition forming the light diffusing sheet 5 becomes difficult.

Although the rear surface of the base sheet 3 of the light diffusing sheet 1 is a smoothed surface, the rear surface may be embossed to improve the light diffusing ability or the sticking-proof ability.

Figure 2:
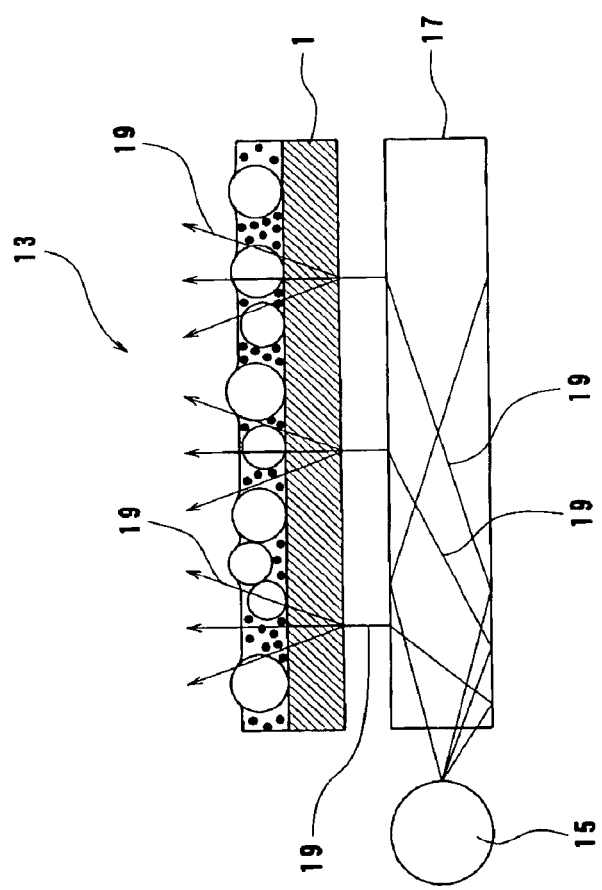
FIG. 2 is a schematic view for explaining a structure of a backlight unit into which the light diffusing sheet of FIG. 1 is incorporated.

FIG. 2 is a schematic view for explaining a structure of a backlight unit 13 into which the light diffusing sheet 1 of FIG. 1 is incorporated. The backlight unit 13 comprises a lamp 15 as a source for generating light rays, a light guiding plate 17 disposed laterally of the lamp 15 for guiding the light rays emitted from the lamp 15 toward a front surface side, and a light diffusing sheet 1 provided on a front surface side of the light guiding plate 17. Although the light guiding plate 17 and the light diffusing sheet 1 are shown as being spaced from each other in convenience in FIG. 2, the front surface of the light 15-, guiding plate 17 actually abuts with the rear surface of the light diffusing sheet 1.

In this backlight unit 13, first, the light rays 19 are emitted from the lamp 15 and guided to the inside of the light guiding plate 17. Then, the light rays 19 are reflected by reflection dots or a reflection sheet (not shown) provided on the rear surface of the light guiding plate 17 and are guided to the light diffusing sheet 1 provided above. Then, the light rays 19 are uniformly diffused when the light rays 19 pass through the light diffusing sheet 1 and are delivered to a polarizer (not shown) provided above the light diffusing sheet 1.

In the backlight unit 13, the lamp 15 emits light and generates heat simultaneously. Thereby, the temperature around the lamp 15 becomes approximately 80 to 90° C. For this reason, a region of the light diffusing sheet 1 in the vicinity of the lamp 15 (in the vicinity of a left end in FIG. 2) is exposed to high temperature. However, the light diffusing sheet 1 has a less tendency to be deflected due to heat because the fine inorganic filler 11 is mixed into the light diffusing layer 5. Therefore, the luminance nonuniformity of the screen of the liquid crystal display is suppressed.

Figure 3:
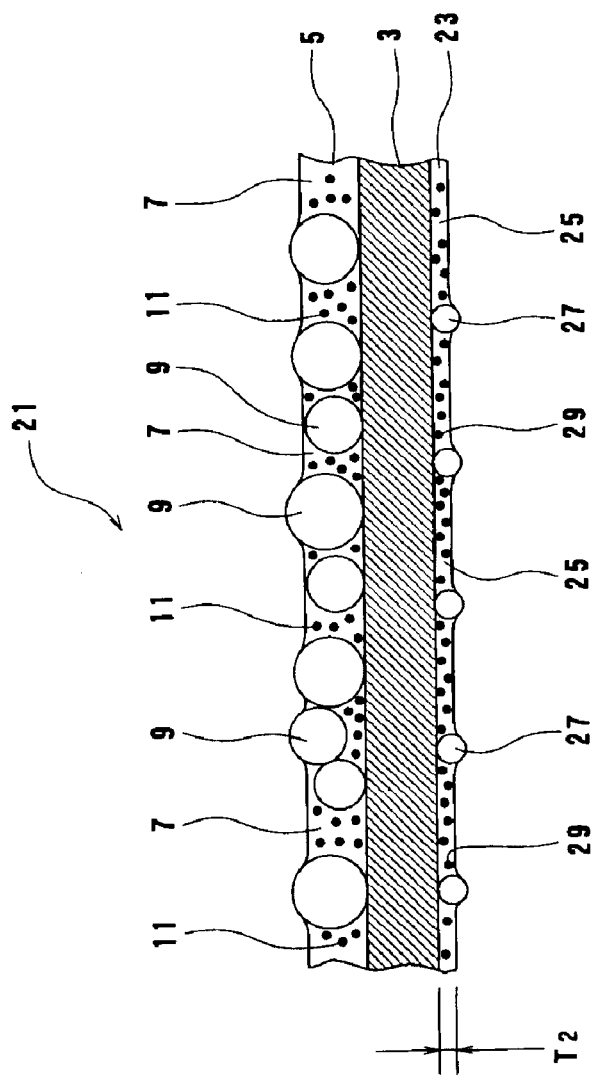
FIG. 3 is a cross-sectional view in which a light diffusing sheet of another embodiment of the present invention is partially omitted.

FIG. 3 is a cross-sectional view in which the light diffusing sheet 21 according to another embodiment of the present invention is partially omitted. The light diffusing sheet 21 comprises a base sheet 3, a light diffusing layer 5 provided on a front surface side of the base sheet 3 and a sticking-proof layer 23 provided on a rear surface of the base sheet 3. The structures of the base sheet 3 and the light diffusing sheet 5 are identical to those of the embodiment shown in FIG. 1.

The sticking-proof layer 23 is constituted by a binder 25, resinous beads 27 dispersed into the binder 25, and a fine inorganic filler 29 dispersed into the binder 25. The materials of the binder 25, the resinous beads, and the fine inorganic filler 29 are identical to those of the light diffusing layer 5. The dispersion of the fine inorganic filler 29 into the sticking-proof layer 23 can increase the apparent crystallinity index of the light diffusing sheet 21. Therefore, the heat resistance of the light diffusing sheet 21 can be increased and the deflection of the sheet 21 can be suppressed. The thickness of the sticking-proof layer 23 (the thickness of the binder 25 except the resinous beads 27 that is represented by T2 in FIG. 3) is not limited but is set to approximately 1 to 10 micrometers.

Since the amount of the mixed resinous beads 27 is relatively small, the resinous beads 27 are dispersed into the binder 25 as being spaced apart from one another. Many of the resinous beads 27 have lower end portions protruded from the binder 25. When the light diffusing sheet 21 is provided on the light guiding plate 17 (see FIG. 2), the protruded lower ends of the resinous beads 27 abut with the surface of the light guiding plate 17. Therefore, the rear surface of the light diffusing sheet 21 does not entirely abut with the light guiding plate 17. Thereby, the sticking of the light diffusing sheet 21 to the light guiding plate 17 is prevented and the luminance nonuniformity of the screen of the liquid crystal display is suppressed.

While in the light diffusing sheet 21, the fine inorganic fillers 11, 29 are dispersed into the light diffusing layer 5 and the sticking-proof layer 23, respectively, the fine inorganic filer 11 may be dispersed into the light diffusing layer 5, or the fine inorganic filler 29 may be dispersed into the sticking-proof layer 23. Alternatively, the light diffusing layer 5 may be formed by embossing, for example, instead of dispersing the resinous beads 9 and the fine inorganic filler 29 may be dispersed into the sticking-proof layer 23 without dispersing the fine inorganic filler 11 into the light diffusing layer 5. Off course, it is preferable that the fine inorganic fillers 11, 29 are respectively dispersed into the light diffusing layer 5 and the sticking-proof layer 23 to reliably suppress the deflection of the light diffusing sheet 21.

Hereinafter, the light diffusing sheet of the present invention will be described in detail according to examples, and the present invention is not to be construed as limitation by disclosure of the examples.

EXAMPLE 1

Into 100 parts by weight of acrylic resin (brand name "RUB medium clear" made by Dainichi Seika Industry Corp.) as a binder, 14 parts by weight of beads (brand name "NT-2" made by Nippon Oil Corp.) made of acrylic resin having an averaged particle diameter of 5 micrometers and 20 parts by weight of colloidal silica (brand name "Snow Tec" made by Nissan Chemical Corp.) having an averaged particle diameter of 0.015 micrometer were mixed and they were stirred by a stirrer to obtain a resinous composition.

The resinous composition was applied on a polyethylene telephthalate film (100 micrometer thick) as a base sheet at an application amount of 15 g/m2 by a roll coating method and cured to form a light diffusing layer. The light diffusing layer is cut into a rectangular layer of 21 centimeters in a longitudinal direction and 15 centimeters in a lateral direction, thereby obtaining the light diffusing sheet of a first example. During a period between stopping of stirring and application, viscosity of the resinous composition was hardly changed and application operation was easy.

EXAMPLE 2

The second example was identical to the first example except that the colloidal silica was replaced by smectite (brand name "lipophilic smectite SAN" made by Cope Chemical Corp.) having an averaged particle diameter of 0.05 micrometer and 20 parts by weight of the smectite were mixed. Thereby, the light diffusing sheet of the second example was obtained. During a period between stopping of stirring and application, the viscosity of the resinous composition was increased and application operation was somewhat difficult.

[Example for Comparison]

A light diffusing sheet as an example for comparison was obtained on the same conditions except that the colloidal silica was not mixed thereinto. During a period between stopping of stirring and application, the viscosity of the resinous composition was hardly changed and application operation was easy.

[Evaluation of Heat Resistance]

The light diffusing sheets of the first example, the second example, and the example for comparison were incorporated into the backlight unit. The backlight unit was put into a temperature controlled bath of 60° C. The presence/absence of deflection of the light diffusing sheets was checked, 2 hours after, 4 hours after, 6 hours after, 8 hours after, 10 hours after, 24 hours after, 48 hours after, and 72 hours after putting the backlight unit into the temperature controlled bath. The judgment of the presence/absence of deflection was made according to whether or not the luminance non-uniformity occurred on surfaces of the light diffusing sheets after lighting of the lamp of the backlight unit. This evaluation result is illustrated in the following table 1.

TABLE 1

Evaluation Result of Heat Resistance

|  |  | Example 1 | Example 2 | Example for Comparison |
|---|---|---|---|---|
| fine inorganic filler |  | colloidal silica | smectite | - - - |
| Viscosity |  | no increase | increase | no increase |
| presence/absence of deflection | 2 h after | Absent | absent | absent |
|  | 4 h after | Absent | absent | partially present |
|  | 6 h after | Absent | absent | present |
|  | 8 h after | Absent | absent | present |
|  | 10 h after | Absent | absent | present |
|  | 24 h after | Absent | absent | present |
|  | 48 h after | Absent | absent | present |
|  | 72 h after | Absent | absent | present |

As can be seen from the table 1, no deflection occurred on the light diffusing sheets of the first and second examples in which the fine inorganic fillers were mixed into the light diffusing layers. On the other hand, deflection occurred on the light diffusing sheet of the example for comparison in which the fine inorganic filler was not mixed into the light diffusing layer, 4 hours after it was put into the temperature controlled bath. From this fact, it is shown that the mixture of the fine inorganic filler improves heat resistance of the light diffusing sheet, prevents deflection of the light diffusing sheet due to heat generated by the lamp, and suppresses the luminance nonuniformity of the screen of the liquid crystal display.

When comparison is made between the first and second examples, the increase in viscosity during a period between stopping of stirring of the resinous composition and application of the resinous composition is less in the first example. From this fact, it is shown that colloidal silica is preferable among the fine inorganic fillers to prevent degradation of workability.

INDUSTRIAL APPLICABILITY

As described above, according to the present invention, the light diffusing sheet having a less tendency to be deflected due to the heat generated by the lamp and the backlight unit using this are obtained.

What is claimed is:

1. A light diffusing sheet comprising:

a transparent base sheet; and a light diffusing layer provided on a front surface side of the base sheet, wherein the light diffusing layer is formed by dispersing resinous beads and a fine inorganic filler into a binder, and the fine inorganic filler is colloidal silica having an average particle diameter that is in a range of 5 nanometers to 50 nanometers.

2. The light diffusing sheet of claim 1, wherein the resinous beads of the light diffusing layer have an averaged particle diameter of 1 micrometer to 50 micrometers.

3. The light diffusing sheet of claim 1, wherein an amount of the fine inorganic filler mixed into the light diffusing layer is 10 parts to 500 parts by weight for 100 parts by weight of a polymer component in the binder.

4. A light diffusing sheet comprising:

a transparent base sheet;

a light diffusing layer provided on a front surface side of the base sheet; and a sticking-proof layer provided on a rear surface side of the base sheet, wherein the sticking-proof layer is formed by dispersing resinous beads and a fine inorganic filler into a binder, and the fine inorganic filler is colloidal silica having an average particle diameter that is in a range of 5 nanometers to 50 nanometers.

5. The light diffusing sheet of claim 4, wherein the resinous beads of the sticking-proof layer has an averaged particle diameter of 1 micrometer to 50 micrometers.

6. The light diffusing sheet of claim 4, wherein an amount of the fine inorganic filler mixed-into the sticking-proof layer is 10 parts to 500 parts by weight for 100 parts by weight of a polymer component in the binder.

7. A backlight unit comprising:

a lamp;

a light guiding plate disposed laterally of the lamp for guiding light rays emitted from the lamp to a front surface side and a light diffusing sheet disposed on a front surface side of the light guiding plate, wherein, said light diffusing sheet comprises;

a transparent base sheet; and a light diffusing layer provided on a front surface side of the base sheet, wherein the light diffusing layer is formed by dispersing resinous beads and a fine inorganic filler into a binder, and the fine inorganic filler is colloidal silica having an average particle diameter that is in a range of 5 nanometers to 50 nanometers.

\* \* \* \* \*